(12) United States Patent
Kakivaya et al.

(10) Patent No.: US 7,934,117 B2
(45) Date of Patent: Apr. 26, 2011

(54) ROUTING TOKEN TRANSFER AND RECOVERY PROTOCOL IN RENDEZVOUS FEDERATION

(75) Inventors: Gopala Krishna Reddy Kakivaya, Sammamish, WA (US); Lu Xun, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 12/020,074

(22) Filed: Jan. 25, 2008

(65) Prior Publication Data
US 2009/0193288 A1 Jul. 30, 2009

(51) Int. Cl.
*G06F 11/00* (2006.01)
(52) U.S. Cl. .............................. 714/4; 714/43
(58) Field of Classification Search .......... None
See application file for complete search history.

(56) References Cited

U.S. PATENT DOCUMENTS

| | | | | |
|---|---|---|---|---|
| 6,798,780 B1 * | 9/2004 | Dan et al. | ................. | 370/395.21 |
| 6,920,580 B1 * | 7/2005 | Cramer et al. | ................... | 714/4 |
| 2004/0039840 A1 * | 2/2004 | Dispensa et al. | ............... | 709/242 |
| 2004/0215772 A1 * | 10/2004 | Dinker et al. | .................. | 709/225 |
| 2005/0262382 A1 * | 11/2005 | Bain | ................. | 714/4 |
| 2006/0053216 A1 * | 3/2006 | Deokar et al. | .................. | 709/223 |
| 2006/0090003 A1 * | 4/2006 | Kakivaya et al. | ............. | 709/238 |
| 2006/0282547 A1 * | 12/2006 | Hasha et al. | .................. | 709/251 |
| 2007/0002774 A1 * | 1/2007 | Hasha et al. | .................. | 370/258 |
| 2008/0031246 A1 * | 2/2008 | Hasha et al. | .................. | 370/390 |
| 2008/0288659 A1 * | 11/2008 | Hasha et al. | .................. | 709/250 |

OTHER PUBLICATIONS

Rowstron et al., "Pastry: Scalable, decentralized object location and routing for large-scale peer-to-peer systems", Nov. 2001.*
Ratnasamy et al., "A Scalable Content-Addressable Network", SIGCOMM'01, Aug. 27-31, 2001.*

* cited by examiner

*Primary Examiner* — Gabriel L Chu
(74) *Attorney, Agent, or Firm* — Turocy & Watson, LLP

(57) ABSTRACT

Systems and methods that provide for assignment and recovery of tokens as part of a plurality of nodes and distributed application framework/network. The assignment component assigns numbers and tasks to candidates and facilitates multiple leader election. Moreover, a recovery component can recover a token for a node that leaves the network (e.g., crashes). Such recovery component ensures consistency, wherein only one server is assigned recovery of the token and associated tasks.

20 Claims, 6 Drawing Sheets

ROUTING TOKEN TRANSFER AND RECOVERY PROTOCOL IN RENDEZVOUS FEDERATION

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. A typical database can be referred to as an organized collection of information with data structured such that a computer program can quickly search and select desired pieces of data, for example. Moreover, in such environments a federation refers to a group of organizations or service providers that have built trust among each other and enable sharing of user identity information amongst themselves.

In general, digital identity corresponds to the electronic information associated with an individual in a particular identity system. With the advent of distributed computing models such as web services, there are increased interdependencies among entities such as a Service Providers (SP's.) Accordingly, a current trend is to focus on inter-organization and inter-dependent management of identity information rather than identity management solutions for internal use. Such can be referred to as federated identity management. In general, federated identity is a distributed computing construct that recognizes that individuals move between corporate boundaries at an increasingly frequent rate. Practical applications of federated identities are represented by large multinational companies that are required to manage several heterogeneous systems at the same time. For example, such an effort can be represented by the notion of Single Sign-On (SSO), which enables a user to login to multiple organizations or SP's by using the same username and password.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation assigns ownership of node (e.g., server) candidates to tasks in a federation via an assignment component, wherein at no time two nodes can claim ownership of the same token (e.g., one and only one node for a token—with no overlap). Each Node of the federation is assigned a unique number, which can be assigned as a random hash (e.g., statistically unique), for example. Moreover, a token represents a continuous range of IDs in an ID space, wherein the ID space is a numerical space that can be an 8 bit number, a 128 bit number, 160 bit number, and the like. The tokens can also be merged or spread to create new tokens. It is to be appreciated that the assignment component itself can be part of the federation, and such assignment component can include a group of nodes that assign IDS in a distributed and decentralized manner, wherein such nodes agree to distribute tokens therebetween (e.g., a successor node and a predecessor node.)

Such assignment component assigns numbers and tasks to candidates and facilitates multiple leader election, wherein a number closest to the task becomes the leader by using a routing token. Typically, in the distributed systems area, reliable leader election allows implementations of distributed consensus, which in turn can be employed to implement replicated state machines (e.g., in the database systems area, reliable leader election enables implementation of reliable primary selection problem, which in turn can be employed to implement consistent replica sets.)

In a related aspect, a recovery component can recover a token for a node that leaves the federation (e.g., crashes). Such recovery component ensures consistency, wherein only one node (e.g., server) is assigned recovery of the token and associated tasks. The recovery component can initiate a recovery protocol by a routing node. A probe message can be sent hop by hop until it reaches another routing node, which can then echo the probe message back hop by hop until it reaches the originator. Moreover, every node on the path back can increment its recovery version to prevent itself from accepting a token that is transferred before it obtains the echo. In addition, the subject innovation can ensure that during such two passes the message is passing through the same set of nodes, wherein no node is missed—e.g., a node that can send out a token transfer and then crash. Accordingly, when the echo reaches the originator of the probe message for that node, the token can be safely recovered.

The nodes are part of a Federation, which represents a collection of domains that have established trust. The level of trust can vary, but typically include authentication and authorization. In general, a federation of the subject innovation can include a number of organizations that have established trust for shared access to a set of resources. At no time two nodes will ever claim ownership of the same token, and a message destined to the given id at any moment is accepted only by that node—(e.g., a safety property). Moreover, when a message is repeatedly sent to a target id, it is eventually accepted, (e.g., a liveness property.)

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
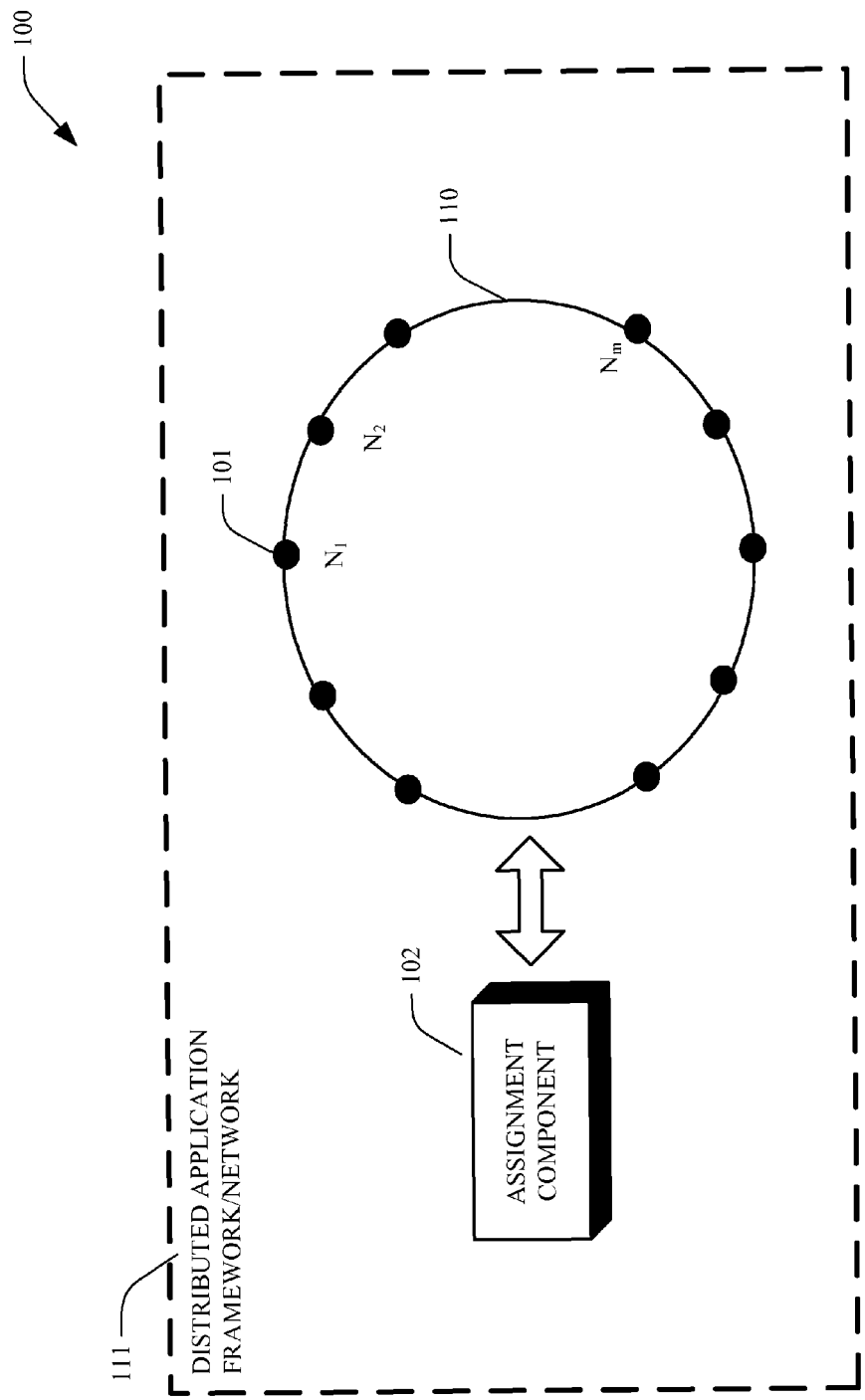
FIG. 1 illustrates a block diagram of a system with an assignment component that is associated with a plurality of nodes for a federation in accordance with an aspect of the subject innovation.

FIG. 1 illustrates a block diagram of a system 100 that implements an assignment component in conjunction with a plurality of nodes as part of a ring 110 in accordance with an aspect of the subject innovation. When the first node $N_1$ 101 comes up in a ring 110, it will create a token that covers the entire number space, and can be referred to as the initial token creation. Subsequently, a token can ideally only be transferred among the nodes ($N_1$ to $N_m$ where m is an integer), so that typically, no two nodes can have overlapping tokens at any time (except for token recovery, as described in detail infra). For example, in a simplest form an administrator can explicitly indicate whether a node whether is first or not.

After the initial creation of the token, such token needs to be split whenever a new node joins in the ring and requires a merger when an existing node leaves the ring and therefore gives up its token to some other node(s). Typically, the ring 110 is associated with a federation that can consist of set of nodes that cooperate among themselves to form a dynamic and scalable network, wherein information can be systematically and efficiently disseminated and located. Moreover, the nodes participating in a federation can be represented as a sorted list using a binary relation that is reflexive, anti-symmetric, transitive, total, and defined over the domain of node identities. For example, both ends of the sorted list can be joined, thereby forming a ring 110. Such provides for each node in the list to view itself as being at the middle of the sorted list. In a related aspect, the list can be doubly linked such that a node can traverse the list in either direction. Moreover, a one-to-one mapping function can be defined from the value domain of the node identities to the nodes themselves. Such mapping function accounts for the sparseness of the nodes in the value domain when the mapping is not tight.

As such, every node participating in the federation is assigned a natural number that is between 0 and some appropriately chosen upper bound, inclusive, and that that range does not have to be consecutive—e.g., there can exist gaps between numbers assigned to nodes. Such number assigned to a node acts as its identity in the ring. The mapping function accounts for gaps in the number space by mapping a number being positioned in between two node identities to the node having an identity that is numerically closest to the number. Accordingly, by assigning each node a uniformly distributed number, it can be ensured that all segments of the ring are uniformly populated. Moreover and as described in detail infra, nodes that indicate the successor, predecessor, and neighborhood computations can be performed efficiently using modulo arithmetic.

As described in detail infra, routing consistency can be achieved via assignment and ownership of tokens. Typically, a node can accept a message only when it has an ownership token on the id to which the message is destined. As explained above, a token contains a consecutive range of IDs and every token has an owner. A token in transit is considered not to exist until it is accepted by a node. Moreover, the range of two tokens must in general be disjoint—wherein all token ranges are disjoint, and a token can be split into two adjacent tokens. Also, two or more adjacent tokens can be merged into a single token, wherein a node does not accept a message without a corresponding token. Additionally, a node must typically own a token that includes at least its own ID. A node owning a token is referred to be in the routing stage and can also be referred to as a routing node. A routing node owns only a single token, or, a single range of IDs, for example. Eventually, the token for an ID will be owned by a routing node that is closest to that ID (e.g., the liveness property). Token transfer should be synchronized with the transfer of data that is stored at any ID in the range of the token. More precisely, token transfer can typically occur only after data transfer is completed. In general, a node that owns a routing token can be referred to as a routing node.

Moreover, a synchronizing node refers to a node in the synchronizing state, which indicates that the node has not yet obtained a routing token, and yet it is ready to acquire its token. Both the synchronizing node and routing node can be referred to as ready node to indicate that such a node can own a token. Typically, every node maintains a neighborhood of H nodes (H being an integer) that are closest to it on each side. N(X) denotes the set of neighbors of node X, wherein Neighborhood edge is a node in N(X) that is furthest away from X. Every node has a neighborhood edge on each of the predecessor and successor directions. If a node Y is in N(X), Y is said to be IN X's neighborhood. If Y is closer to X than X's neighborhood edge (on the same side of X), Y is said to be WITHIN X's neighborhood. It is to be appreciated that it is possible for Y to be within X's neighborhood but not in the neighborhood if X is not aware of the existence of Y. In one aspect, the subject innovation requires and/or assumes that the following property is guaranteed in the ring via the neighborhood maintenance protocol; such property being that for any node X, if there exists another ready node Y that is within X's neighborhood—then Y must also be in X's neighborhood.

Figure 2:
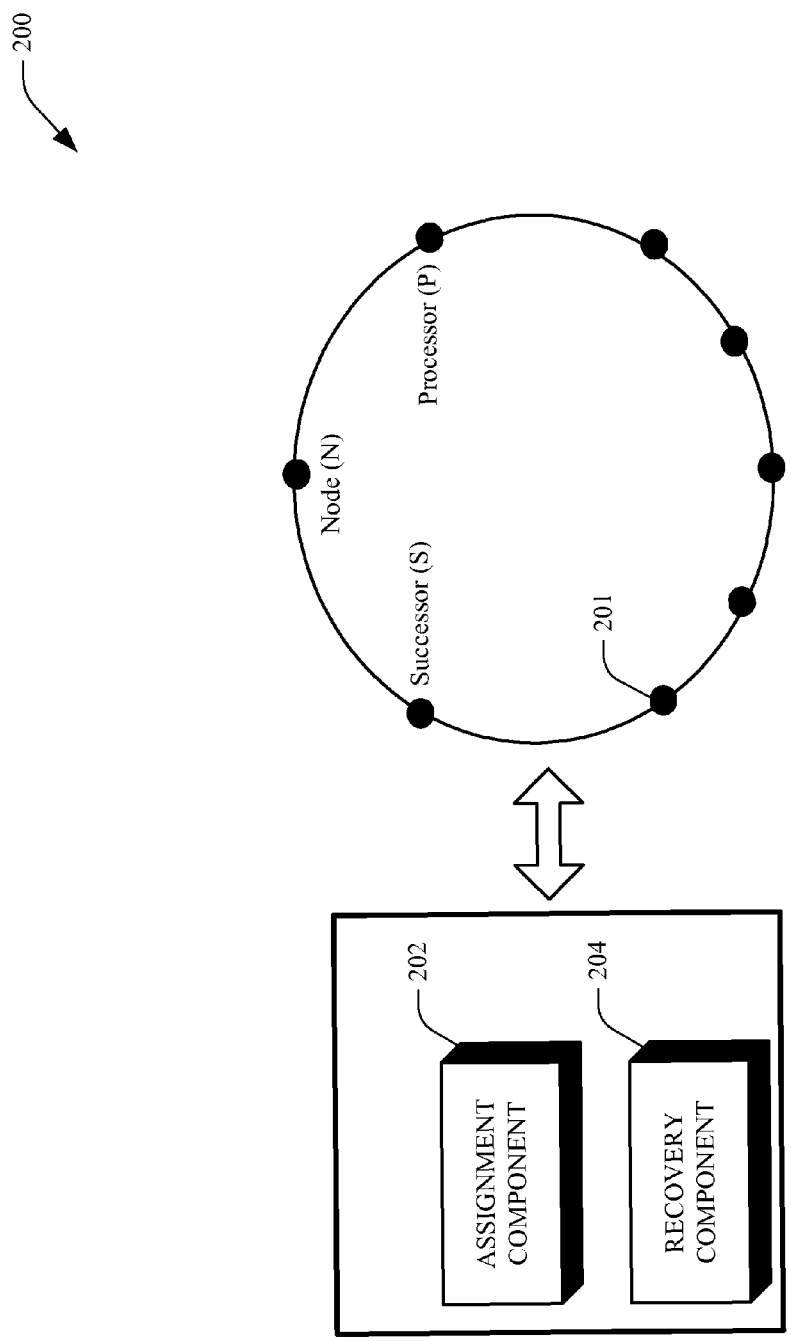
FIG. 2 illustrates a block diagram of a system that employs a recovery component in conjunction with a plurality of nodes in accordance with an aspect of the subject innovation.

FIG. 2 illustrates a system 200 of distributed application framework that implements a recovery component 204 in accordance with an aspect of the subject innovation. The recovery component 204 can initiate the recovery protocol by a routing node. A probe message can be sent hop by hop until it reaches another routing node, which can then echo the probe message back hop by hop again until it reaches the originator. Moreover, every node on the path back can increment its recovery version to prevent itself from accepting a token that is transferred before it obtains the echo.

Under such system a node N claims ownership of the id range between its successor S and predecessor P nodes. The ownership range can be determined to be (N−(N−P)/2, N+(S−N)/2] using modulo arithmetic. Such can indicate that P, N, and S nodes have to be in agreement to guarantee only one node accepts the message sent to a target id, wherein such agreement implies ring consistency. It is to be appreciated that ring consistency alone is not sufficient to satisfy the safety property—e.g., since partitioned rings can be individually consistent, and yet violate the safety property. Various aspects of the subject innovation typically prevents ring partitions from developing from the very beginning.

Every node 201 maintains a sequence number for its token operations. The sequence number can be initialized to "0" and is increment for every token operation. The token operations are token creation, token splitting, token merger, and token recovery. All token transfer messages specify the target token sequence number at which the transferred token can be accepted by the receiving node. A receiving node cannot accept a transferred token if the specified target sequence number does not match its current token sequence number. For example, an initial seed node in a ring creates a valid token for the entire ID space and automatically becomes a routing node. As described in detail infra, any other joining node attempts to acquire its token from an existing closest routing node as it owns the ID for the joining node. The joining node locates the closest node by routing a token request message to its own ID. When a routing node receives a token request from a non-routing node with an ID of x (x being am integer), it splits its valid token into two using the midpoint of its own ID and x as the partition point and transfers the token containing x to the joining node while retaining the other token.

Whenever a routing node finds a new successor or predecessor routing node with an ID of x, it checks to verify if its token contains ID space that is closer to the new node. If so, it splits its token into two using the midpoint of its own ID and x as the partition point and transfers the token containing x to the new node while retaining the other token. Every routing node can periodically talk to its immediate neighbor nodes so that it has infinite chances to perform such act.

As described in detail infra, when a routing node desires to leave the ring, it breaks its token into two parts using the midpoint of the predecessor and successor IDs as the partition point and transfers the two tokens to the predecessor and successor nodes respectively. Moreover, a node can accept an incoming token if it does not own a token and the incoming token range contains its own ID or its token is adjacent to the incoming one. If it cannot accept the token, it should reject it and, if possible, suggest a node that is known to be adjacent to the incoming token range. A routing node that has successfully obtained its token from both its successor and predecessor nodes is hence forth called an operating node. It is appreciated that an operating node is also a routing node and it remains an operating node until it reboots.

Figure 3:
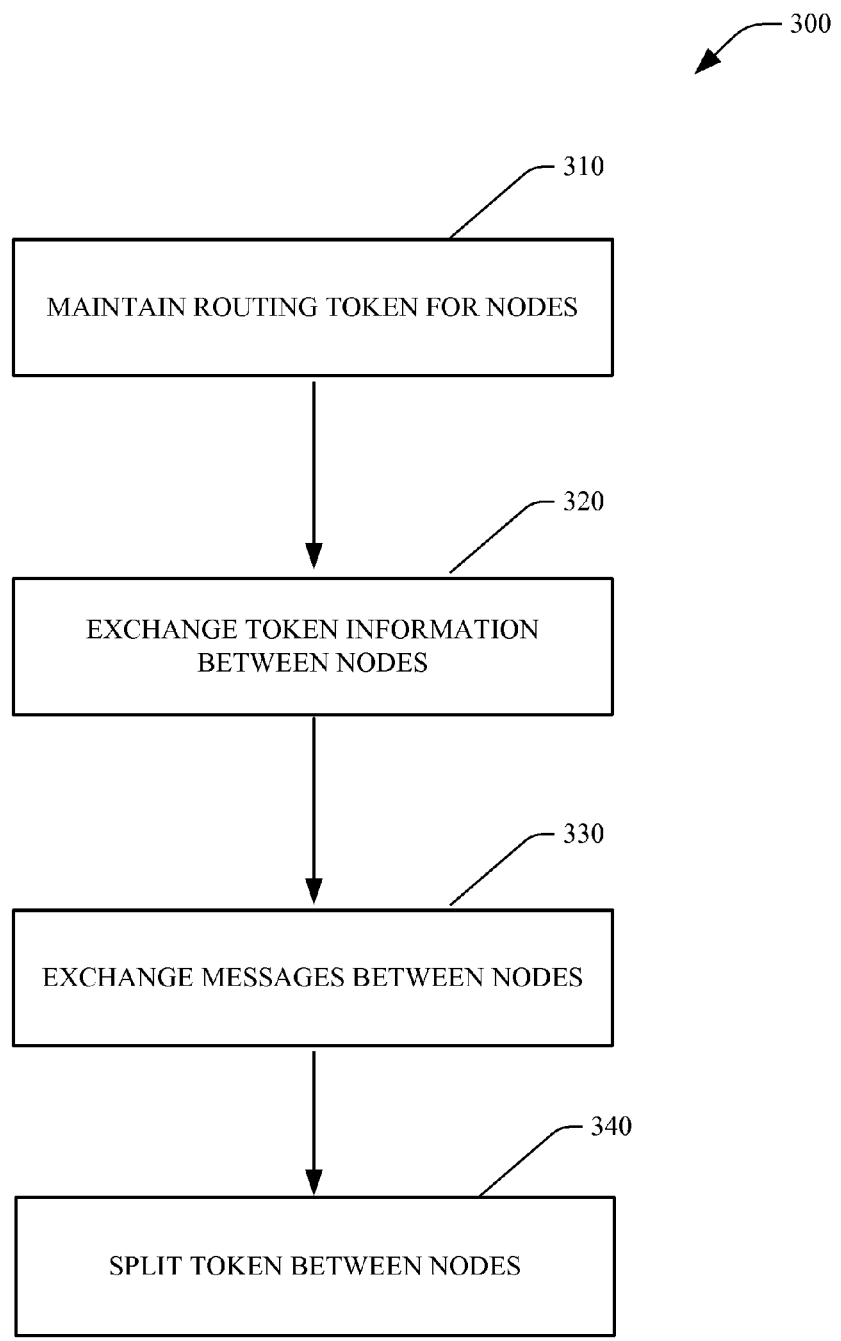
FIG. 3 illustrates a methodology of assigning tasks to nodes according to an exemplary aspect of the subject innovation.

FIG. 3 illustrates a related methodology of assigning ownership of tasks and nodes in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 310, every node maintains a routing token that contains the information such as: token range, token version and recovery (as described in detail infra.) For the first node in the ring, an initial token will be created with a token range of the entire node ID number space and a token version of 1. For every other node, when such node tries to join the ring it will initialize its token range to be empty and its token version to be 0. At 320 tokens can be exchanged between nodes, wherein token can be part of the liveness headers that are exchanged between nodes when they send messages. Subsequently and at 330, a node can therefore learn about the other nodes' most recent token. It determines the freshness of such information using token version. Accordingly, whenever a routing node X finds another ready node Y that is a better owner for a sub range of its current token, it should split its current range and transfer the sub range to Y in a TOKENTRANSFER message. Likewise, whenever a node Y receives a token in a TOKEN-TRANSFER message, it can reject the token in a TOKEN-REJECT message (with the rejected token) if any of the following is true:

Y currently does not own a token and the token transferred to it does not contain Y's node ID.

Y currently owns a token and the token transferred to it is not adjacent to its current token.

Moreover, if Y decides not to reject the token transferred to it from node X, it should perform the following to accept the token:

Merge the token range in the transferred token to its current token range.

Increase its token version by 1.

Send a TOKENACCEPTED message back to X with its current token so that X can learn about Y's new token.

Furthermore, when node X receives TOKENREJECT message from Y, it can treat the message as if it was a TOKENTRANSFER message and try to accept the rejected token. However, if it can not do so it will not send another TOKENREJECT message to Y. The transferred token is effectively lost in this situation and will have to be recovered. Likewise, when a node leaves the ring, it should split its token into two ranges and transfer them to its immediate neighbors on each side. It can either do so using the TOKENTRANS-FER message or more efficiently achieve the same effect by embedding the token in the DEPART message. The receiving node should treat the token in the DEPART message the same way it treats the token in TOKENTRANSFER message without sending TOKENREJECT message in the reject scenario since the departing node will not reclaim the token anyway. A node can only accept a routed message if it owns the token for the destination of the routed message. If it does not own the token and can not find any closer routing node, it should hold the message until there is one or it owns the token. Such provides for splitting the node at 340. From the above methodology the following features can be concluded in that, 1) no two nodes will ever own overlapping tokens, which implies routing consistency, and 2) a routing node must own the token that contains its own ID and every routing token is contiguous.

Figure 4:
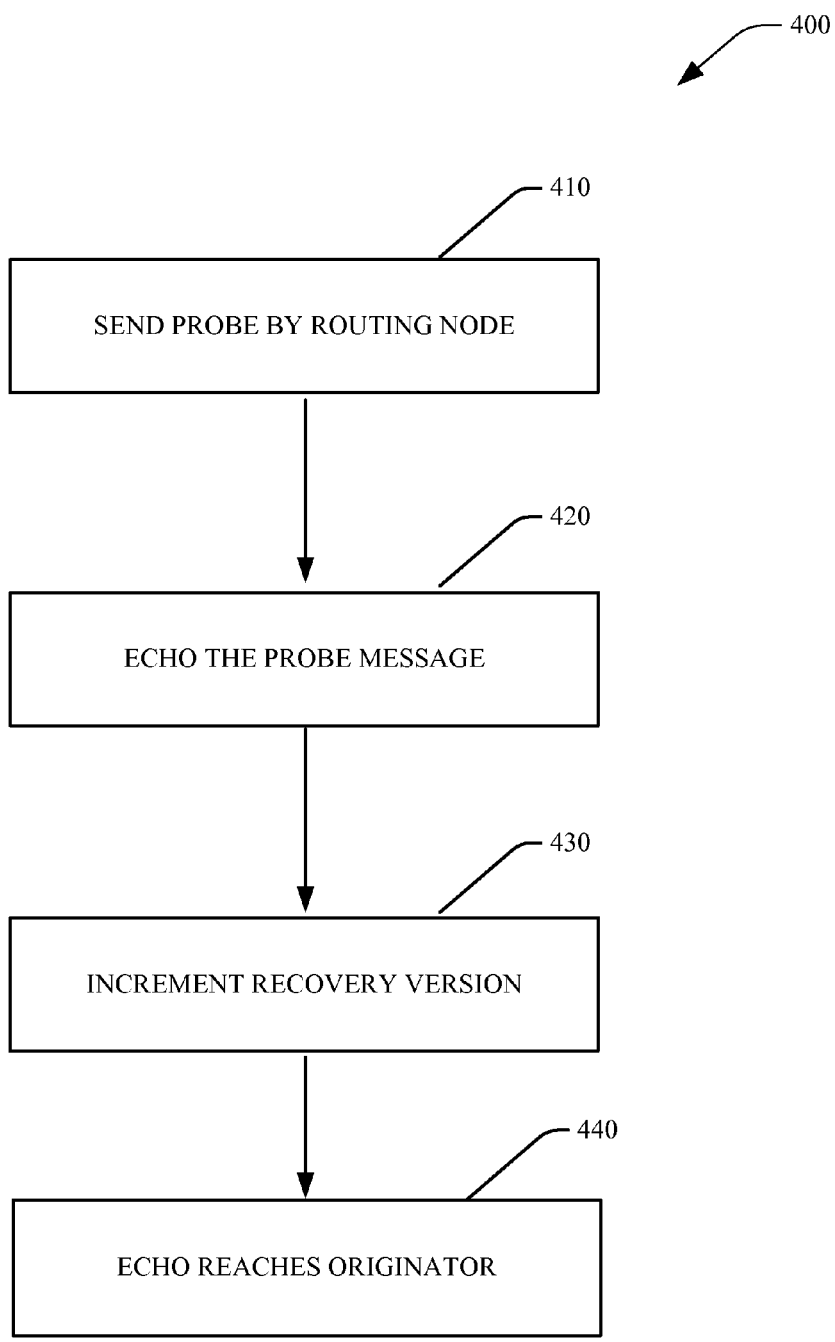
FIG. 4 illustrates a methodology of recovering nodes according to a further aspect of the subject innovation.

FIG. 4 illustrates a related methodology 400 of token recovery in accordance with an aspect of the subject innovation. In general, a token can be lost because of communication failures and/or nodes leaving abruptly. Such tokens need to be recovered to guarantee liveness. For example, a routing node can perform token recovery if it finds that there is a range gap between its own token and the token of its immediate routing neighbor and it is sure that there exists no node (routing or non-routing) between itself and its immediate neighbor (in terms of ID).

Initially, and at 410 a probe can be sent, wherein a probe message can be sent hop by hop until it reaches another routing node. Subsequently, an echo of the probe message can occur at 420. At 430, every node on the path back can increment its recovery version to prevent itself from accepting a token that is transferred before it obtains the echo. At 440, when the echo reaches the originator of the probe message that node can safely recover the token. When node X detects that there can be a token range gap between its token range and the next routing node Y's token range, it will initiate the token recovery process.

The various acts above is described in detail via the following discussion. When node X detects that there can be a token range gap between its token range and the next routing node Y's token range, it will initiate the token recovery process. Such occurs by sending out a PROBE message to its immediate neighbor on the direction that the suspected gap exists. In the PROBE message X will include its token, and the recipient's node information, along with every node in between X and the recipient (these nodes are either shutdown or just booted and are not available yet and therefore are not considered as neighbors to X). When a non-routing node Z receives a PROBE message, it will forward the message along to its immediate neighbor on the same direction. Before Z forwards the message, it will add itself and every node in between Z and the recipient to the PROBE message. Accordingly, the message will contain information about every node (available or not-available) that are on the forwarding path. Such can be referred to as the probe path. When a routing node Y receives a PROBE message that is originated from X, it signifies that between X and Y there was no routing nodes and a token recovery is likely to be safe. However, Y can not recover the token at this point because of the possible in-flight token transfers. Instead, Y will first discard any token range that it owns that is beyond the mid point of X and Y (if any) and then it will send an ECHO message to its immediate neighbor on the direction which the PROBE message comes in. In the ECHO message it will include both its own token and X's token that is embedded in the PROBE message. When a non-routing node Z receives an ECHO message, it will forward it to its immediate neighbor after performing the actions described below.

Typically, the following actions are common for every node that needs to initiate or forward an ECHO message. The recovery version can be incremented in its routing token, even if the routing token is not valid yet (the range is empty). The unavailable nodes between itself and the node's immediate neighbor can be checked to verify whether a node recorded to be up in the first pass is now shutdown. Such a node could have accepted a token and then transferred part of its token to another node and crashed, in which case the in-flight token will make the recovery unsafe. Such also applies to a node that is not recorded in the first pass because it too can first join the ring, obtain the token, transfer the token and then shutdown. In either case, the echo message can be dropped and this recovery process is aborted (the originator will retry later). Moreover, if the ECHO message reaches a routing node Z that is not the originator of the PROBE, it must be a node that just becomes routing recently. The message can be dropped and abort the recovery. Furthermore, if the ECHO message reaches the originator X of the PROBE, node X can try to recover the token if the following checks are passed:

It will first check whether its token version is the same as when it initiates the PROBE (note that the version is captured in both the PROBE and ECHO messages). If not, such indicates that the originator has either merged or split its token after the recovery process and the recovery will not be safe, in which case the message will simply be discarded.

It will also check the recovery version to see whether it has changed since it initiates the PROBE. If the recovery version has changed it indicates that the originator has echoed a PROBE from another node, which might make the recovery unsafe. If such occurs X will also drop the message.

If the originator X verifies that it is safe to recover the token, it will get the node ID and token range of the routing node Y that initiated the ECHO message (which is recorded in the message). It can then calculate the range gap between the token of X and Y and recover that gap. After recovery it can retain the part up to the mid point between X and Y and immediately send out a TOKENTRANSFER message to Y with the range that is beyond the mid point. A very important rule can also be added to the token transfer protocol: when node X sends a TOKENTRANSFER message to Y, it must also include its knowledge of Y's recovery version. When Y receives the message, it can typically compare the recovery version in the message with its current recovery version and rejects the token if they do not match. Furthermore, another rule is that for every node that is involved in the PROBE and ECHO, if it has lost its entire neighborhood on either side (every node in its neighborhood is down), it can not forward the message because it no longer knows which node is its immediate neighbor.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 5:
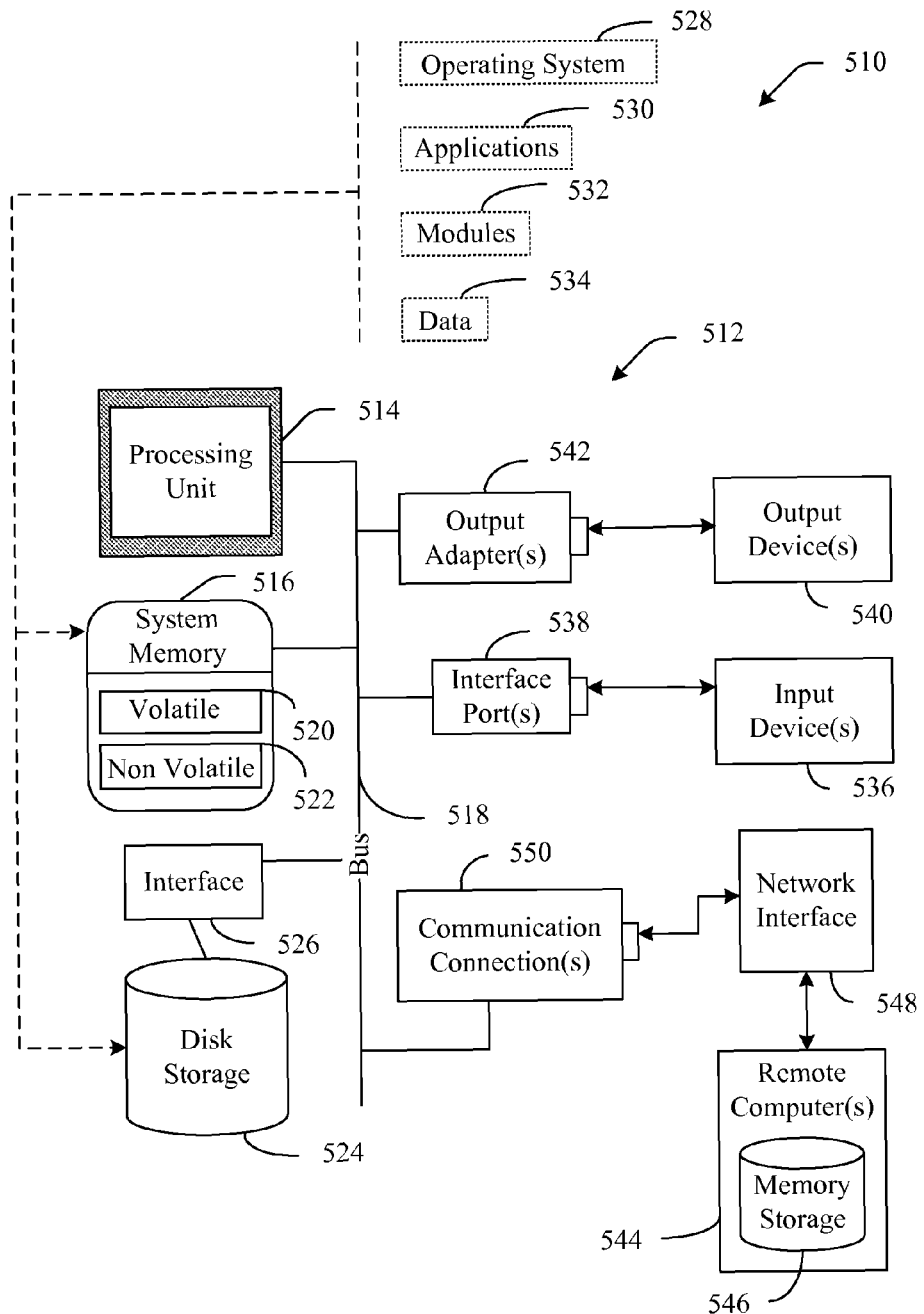
FIG. 5 illustrates an exemplary environment for implementing various aspects of the subject innovation.
Figure 6:
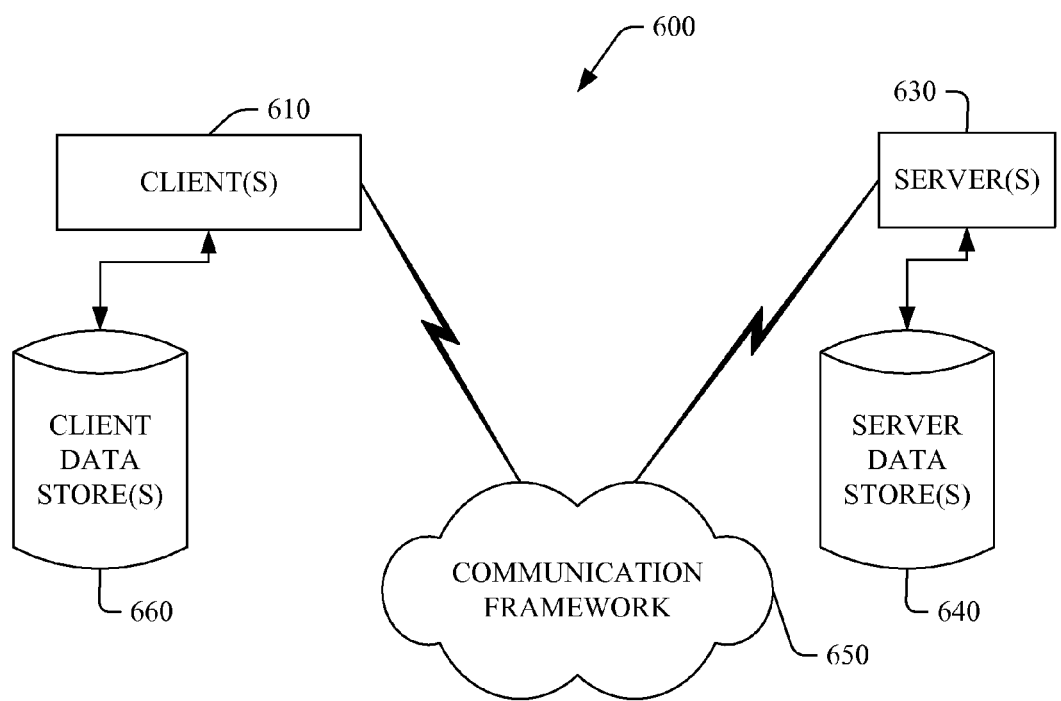
FIG. 6 is a schematic block diagram of a sample computing environment that can be employed for data retrieval according to an aspect of the subject innovation.

In order to provide a context for the various aspects of the disclosed subject matter, FIGS. 5 and 6 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 5, an exemplary environment 510 for implementing various aspects of the subject innovation is described that includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 516 includes volatile memory 520 and nonvolatile memory 522. The basic input/output system (BIOS), containing the basic routines to transfer information between elements within the computer 512, such as during start-up, is stored in nonvolatile memory 522. For example, nonvolatile memory 522 can include read only memory (ROM), programmable ROM (PROM), electrically programmable ROM (EPROM), electrically erasable ROM (EEPROM), or flash memory. Volatile memory 520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 512 also includes removable/non-removable, volatile/non-volatile computer storage media. FIG. 5 illustrates a disk storage 524, wherein such disk storage 524 includes, but is not limited to, devices like a magnetic disk drive, floppy disk drive, tape drive, Jaz drive, Zip drive, LS-60 drive, flash memory card, or memory stick. In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in suitable operating environment 510. Such software includes an operating system 528. Operating system 528, which can be stored on disk storage 524, acts to control and allocate resources of the computer system 512. System applications 530 take advantage of the management of resources by operating system 528 through program modules 532 and program data 534 stored either in system memory 516 or on disk storage 524. It is to be appreciated that various components described herein can be implemented with various operating systems or combinations of operating systems.

A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to computer 512, and to output information from computer 512 to an output device 540. Output adapter 542 is provided to illustrate that there are some output devices 540 like monitors, speakers, and printers, among other output devices 540 that require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a personal computer, a server, a router, a network PC, a workstation, a microprocessor based appliance, a peer device or other common network node and the like, and typically includes many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to computer 512. The hardware/software necessary for connection to the network interface 548 includes, for exemplary purposes only, internal and external technologies such as, modems including regular telephone grade modems, cable modems and DSL modems, ISDN adapters, and Ethernet cards.

FIG. 6 is a schematic block diagram of a sample-computing environment 600 that can be employed for implementing nodes as part of a federation, in accordance with an aspect of the subject innovation. The system 600 includes one or more client(s) 610. The client(s) 610 can be hardware and/or software (e.g., threads, processes, computing devices). The system 600 also includes one or more server(s) 630. The server(s) 630 can also be hardware and/or software (e.g., threads, processes, computing devices). The servers 630 can house threads to perform transformations by employing the components described herein, for example. One possible communication between a client 610 and a server 630 may be in the form of a data packet adapted to be transmitted between two or more computer processes. The system 600 includes a communication framework 650 that can be employed to facilitate communications between the client(s) 610 and the server(s) 630. The client(s) 610 are operatively connected to one or more client data store(s) 660 that can be employed to store information local to the client(s) 610. Similarly, the server(s) 630 are operatively connected to one or more server data store(s) 640 that can be employed to store information local to the servers 630.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising at least one processor coupled to at least one machine-readable storage medium storing instructions executable by the at least one processor to implement:
   an assignment component configured to assign tokens to nodes of a collection of nodes; and
   a recovery component configured to perform a token recovery protocol based on detecting a token range gap;
   wherein the recovery protocol comprises sending a probe message along a probe path in a direction of a suspected token range gap, the probe path including at least an immediate neighbor of a node sending the probe message, and the probe message including a token of the sending node and information corresponding to a recipient node and each node in the probe path between the sending node and the recipient node.

2. The computer implemented system of claim 1, wherein the assignment component is configured to assign tokens to nodes such that at no time do two distinct nodes of the collection of nodes have overlapping tokens, except for during the token recovery protocol.

3. The computer implemented system of claim 1, wherein the token recovery protocol further includes, by a routing node receiving the probe message, discarding a token range beyond a midpoint between the routing node and the sending node, and sending an echo message along the probe path in the direction of the sending node, the echo message including a token of the routing node and a token of the sending node.

4. The computer implemented system of claim 3, wherein the recovery protocol further comprises, if the echo message reaches the node sending the probe message, by the sending node, checking whether a version of its token has changed, and if not, based on a token range of the token of the routing node, calculating a range gap between the sending node and the routing node, and recovering the calculated range gap.

5. The computer implemented system of claim 1, wherein the assignment component is configured to assign a unique number to a node of the collection of nodes.

6. The computer implemented system of claim 1, further comprising a mapping function configured to map identities to the nodes.

7. The computer implemented system of claim 1, wherein the assignment component is configured to assign tasks to candidate nodes.

8. The computer implemented system of claim 1, wherein at least one node of the collection of nodes maintains a routing token containing information including at least a token range and a token version.

9. The computer implemented system of claim 8, wherein the token range is separable into two ranges transferable to neighboring nodes.

10. A method comprising:
    by a node in a collection of nodes in a network, detecting a gap between a token associated with the node and a token associated with a neighboring node of the collection of nodes;
    based on the detecting, sending a probe message including information corresponding to each node along a probe path in the direction of the gap;
    receiving an echo message in response to the probe message, sent along the probe path in the direction of the node detecting the gap; and
    if after receiving the echo message the node detecting the gap determines that a version of the token associated with the node detecting the gap has not changed, initiating a recovery of a token associated with the gap.

11. The method of claim 10, further comprising splitting a token range associated with the node.

12. The method of claim 10, further comprising calculating a range gap between the node detecting the gap and a node sending the echo message.

13. The method of claim 12, further comprising recovering the calculated range gap.

14. The method of claim 13, further comprising checking unavailable nodes of the collection of nodes.

15. The method of claim 13, further comprising preventing acceptance of a token before receiving the echo message.

16. The method of claim 10, further comprising, by each node along the probe path traveled by the echo message, incrementing a corresponding token version before it receives the echo message determining a token version.

17. The method of claim 16, further comprising discarding a token range to account for possible in-flight token transfers.

18. The method of claim 10, further comprising assigning numbers and tasks to nodes of the collection of nodes.

19. The method of claim 10, further comprising claiming ownership of a node identification.

20. A computer-readable storage medium storing instructions, the instructions if executed by a computing device causing the computing device to perform operations comprising:
    for a plurality of nodes in a network, assigning non-overlapping token ranges to the nodes;
    detecting a gap in an assigned token range; and
    based on the detecting, performing a token recovery associated with the gap, the token recovery including
        calculating a range of the gap, in a probe path traveled by a probe message sent by a node detecting the gap and echoed by a routing node, and
        recovering the calculated range if the echoed message indicates that a version of the node detecting the gap has not changed.

* * * * *